(12) United States Patent
Li et al.

(10) Patent No.: US 10,350,454 B1
(45) Date of Patent: Jul. 16, 2019

(54) AUTOMATED CIRCUIT TRAINING

(71) Applicant: Moov Inc., Burlingame, CA (US)

(72) Inventors: Meng Li, Mountain View, CA (US); Yaohua Hu, Mountain View, CA (US); Tong Yuan, Beijing (CN)

(73) Assignee: Moov Inc., San Mateo, CA (US)

( * ) Notice: Subject to any disclaimer, the term of this patent is extended or adjusted under 35 U.S.C. 154(b) by 568 days.

(21) Appl. No.: 14/971,039

(22) Filed: Dec. 16, 2015

Related U.S. Application Data

(60) Provisional application No. 62/094,760, filed on Dec. 19, 2014.

(51) Int. Cl.
*A63B 24/00* (2006.01)
*G09B 19/00* (2006.01)

(52) U.S. Cl.
CPC ........ *A63B 24/0062* (2013.01); *G09B 19/003* (2013.01)

(58) Field of Classification Search
CPC .......................... G09B 19/003; A63B 24/0062
USPC ...................................................... 434/247
See application file for complete search history.

(56) References Cited

U.S. PATENT DOCUMENTS

| | | | |
|---|---|---|---|
| 9,072,929 B1* | 7/2015 | Rush | G09B 19/003 |
| 2013/0244211 A1* | 9/2013 | Dowling | G06F 19/3481 434/247 |
| 2013/0245966 A1* | 9/2013 | Burroughs | G06F 19/3481 702/44 |

* cited by examiner

*Primary Examiner* — Robert P Bullington
(74) *Attorney, Agent, or Firm* — Van Pelt, Yi & James LLP

(57) ABSTRACT

Techniques of the present disclosure guide an exercise, including counting a number of repetitions, a duration of a static movement, and providing feedback regarding the exercise. In some embodiments a plurality of motion data samples are obtained and collected during a repetitive fitness exercise. A set of extreme points is identified among the plurality of motion data samples, a number of repetitions performed during the fitness exercise is determined based on the set of extreme points, and the information regarding the determined number of repetitions is output. With this information, the management device can give context-aware coaching feedback to the users, for example, counting, motivating, and giving instructions on the exercise.

21 Claims, 12 Drawing Sheets

300

350

400

600

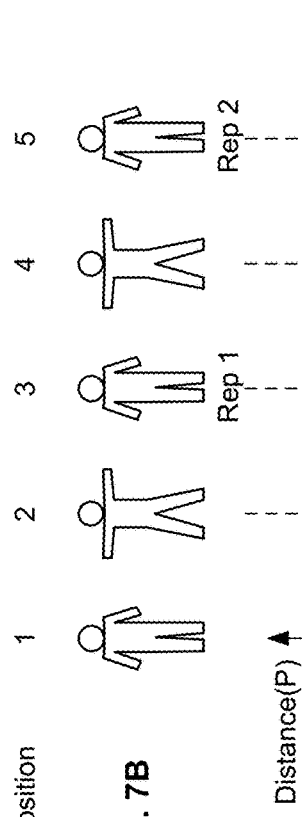
FIG. 7A
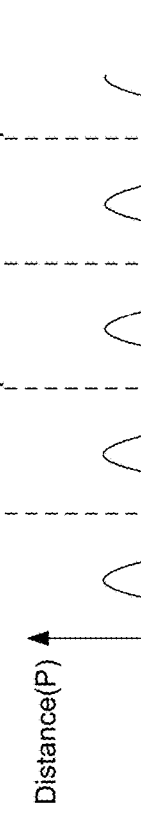
FIG. 7B
FIG. 7C
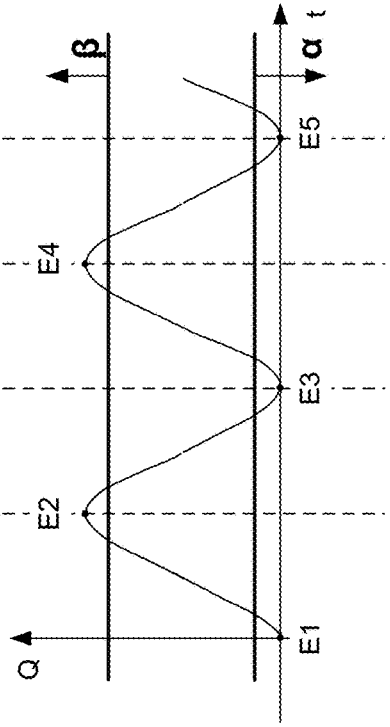
FIG. 7D
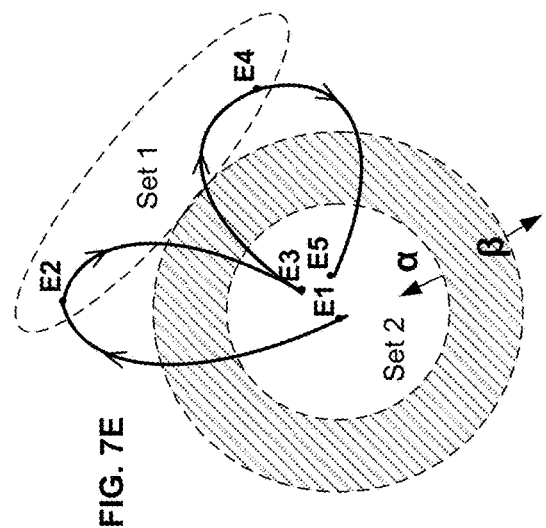
FIG. 7E

800

US 10,350,454 B1

AUTOMATED CIRCUIT TRAINING

CROSS REFERENCE TO OTHER APPLICATIONS

This application claims priority to U.S. Provisional Patent Application No. 62/094,760 entitled AUTOMATED CIRCUIT TRAINING filed Dec. 19, 2014 which is incorporated herein by reference for all purposes.

BACKGROUND OF THE INVENTION

Conventional ways of exercising to achieve fitness goals can be challenging for many people. Exercising typically involves performing repetitive motions, which many view as tedious and therefore not enjoyable. Moreover, it is difficult for individuals to track the performance of their exercises besides using basic measurements such as time and distance. Today, one often needs to hire a personal trainer to get deeper knowledge and advice about one's workouts. In addition to the high cost, the expertise of the personal trainers can vary and the quality of their advice cannot be guaranteed.

There are some wearable devices that provide functions such as automatic step counting or distance tracking. These devices, however, typically only provide limited information about basic exercises such as how much a person has walked in a day, which can be insufficient for those who want to improve the quality of their workouts in addition to quantity. These devices also typically are unable to accurately identify and track repetitive motions.

BRIEF DESCRIPTION OF THE DRAWINGS

Various embodiments of the invention are disclosed in the following detailed description and the accompanying drawings.

FIG. 7A is a diagram illustrating data points gathered by a sensor of a user's motion during a jumping jack exercise.

FIG. 7B is a diagram illustrating a simulation of a user's motion during a jumping jack exercise.

FIG. 7C is a diagram illustrating a sequence of user data points during a jumping jack exercise.

FIG. 7D is a diagram illustrating a user's orientation during a jumping jack exercise.

FIG. 7E is a diagram illustrating grouping of data points based on a user's orientation during a jumping jack exercise.

DETAILED DESCRIPTION

Figure 1:
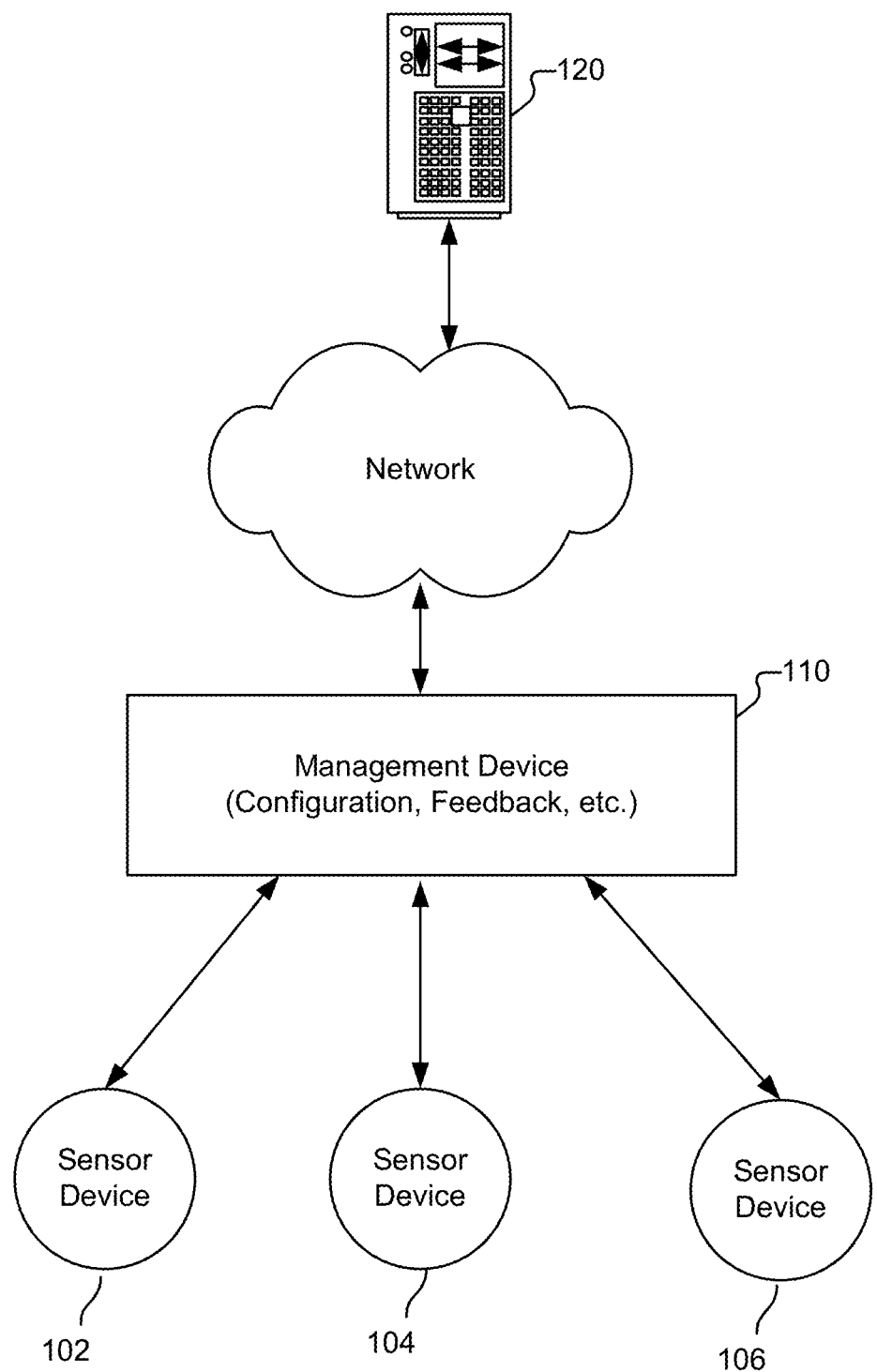
FIG. 1 is a system diagram illustrating an embodiment of an automated fitness coaching system.

The invention can be implemented in numerous ways, including as a process; an apparatus; a system; a composition of matter; a computer program product embodied on a non-transitory computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

The present disclosure provides techniques to guide an exercise, including counting a number of repetitions, a duration of a static movement, and providing feedback regarding the exercise. The exercise can be guided by an application installed on the management device. The user wears one or more sensor devices on his wrist, ankle, arm, or any other appropriate part of the body or equipment. As further described herein, in some embodiments, the sensor is worn in a body region that is expected to be in motion during the exercise. In other embodiments, the sensor is worn in a body region that is expected to be substantially static during the exercise. The user's motion is processed to identify and analyze stages of an exercise, including: a preparation stage, back and forth motion of each repetition ("rep" for simplicity), staying in static motion, fatigue, and/or a termination stage. For example, a user may terminate the exercise due to giving up, running out of time to complete the exercise, and the like. With this information, the management device can give context-aware coaching feedback to the users, for example, to count, to motivate and to give instructions on the exercise. The exercise is typically structured as a circuit training program but can be used in any workout structure.

FIG. 1 is a system diagram illustrating an embodiment of an automated fitness coaching system. In this example, one or more sensor devices 102-106 are used to detect motions performed by a user. A user wears one or more sensor device(s) during exercise (e.g., on the ankle while running, on arms and legs while swimming, etc.) to capture motion data. As will be described in greater detail below, a sensor device includes one or more accelerometers and one or more gyroscopes, and, optionally, one or more magnetometers. The sensor device is configured to take measurement data samples of acceleration, angular velocity, and, optionally magnetic field in connection with the user motions. In some embodiments, the accelerometer(s), the gyroscope(s), and the magnetometer(s) are implemented using one or more integrated circuits (ICs).

The data samples are processed to evaluate the user's performance and, optionally, to provide feedback. In some embodiments, a sensor device includes an onboard processor configured to perform the data processing and evaluation, as well as an output mechanism to provide feedback such as information about the user's form, the difference between the user's form and the target, what the user can do to improve his form, etc. Examples of the output mechanism to provide feedback include a speaker to provide audio feedback, a video screen or a light to provide visual feedback, a haptic display to provide tactile feedback, and the like. In some embodiments, such as the example shown in FIG. 1, the sensor devices are connected (e.g., via a wireless communication interface such as a Bluetooth® interface) to a management device 110, which can be a personal computer, a smartphone, a tablet, or any other appropriate computing device that is configured to perform the data processing, evaluation, and/or feedback. The feedback information can be provided to the user on the management device, provided to the sensor device to be played, or otherwise conveyed to the user. The management device also executes configuration and any other related management application to manage the configuration and operations of the sensor devices.

In some embodiments, the management device (or the sensor device if the sensor device directly performs processing) is optionally connected to a server 120 via a network such as the Internet. Data such as configuration, measurements, performance, etc. can be stored on the server to be accessed later and/or further processed.

Figure 2A:
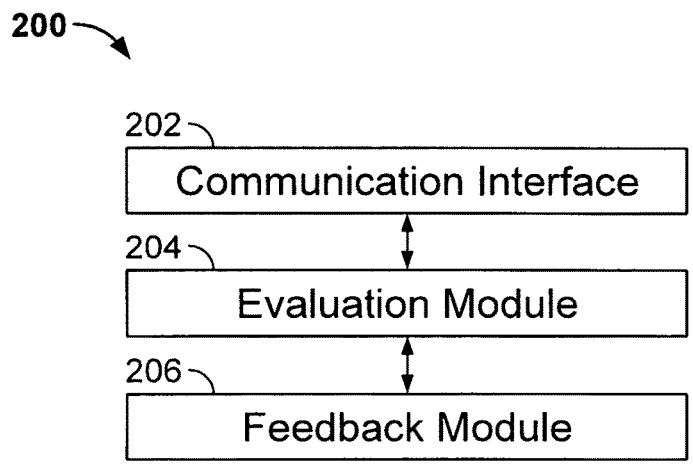
FIG. 2A is a functional diagram illustrating an embodiment of an automated fitness coaching system.

FIG. 2A is a functional diagram illustrating an embodiment of an automated fitness coaching system. System 200 includes a communication interface 202 configured to receive motion data samples pertaining to motions performed by a user of the system. Examples of a communication interface include, without limitation, external connections, such as a port, cable, wireline or wireless network interface card, etc., and internal connections such as a communication bus.

System 200 further includes an evaluation module 204 coupled to the communication interface. The evaluation module is configured to determine, based at least in part on the motion data samples, velocity and orientation associated with a subset of the user's motions. In some embodiments, the processing by the evaluation module includes removing or reducing any inaccuracies in the data samples received from the sensors. This processing is also referred to as "correcting core measurements." In some embodiments, the evaluation module derives, based on the corrected core measurements, form measurements of the user's body positions for a subset of the user's motions.

System 200 further includes a feedback module 206 coupled to the evaluation module. Based on the evaluation results, the feedback module provides feedback to the user via audio, visual, haptic, and/or any other appropriate form of output. In various embodiments, the feedback module includes a microphone, a display screen, an LED, a haptic output that provides tactile feedback, and/or any other appropriate output device.

The modules 202, 204, 206 can be implemented as software components executing on one or more processors, as hardware such as programmable logic devices and/or Application Specific Integrated Circuits designed to perform certain functions, or a combination thereof. In some embodiments, the modules can be embodied by a form of software products which can be stored in a nonvolatile storage medium (such as optical disk, flash storage device, mobile hard disk, etc.), including a number of instructions for making a computer device (such as personal computers, servers, network equipment, etc.) implement the methods described in the embodiments of the present application. The modules may be implemented on a single device or distributed across multiple devices. The functions of the modules may be included in another module or further split into multiple sub-modules. In some embodiments, the communication interface 202, the evaluation module 204, and the feedback module 206 are all implemented on a management device (e.g., the management device 110 shown in FIG. 1), where the motion data samples are sent by a sensor device to the management device, received by its communication interface, evaluated by the evaluation module, and feedback information is presented by the feedback module. In some embodiments, the communication interface 202, the evaluation module 204, and the feedback module 206 are all implemented on a sensor device, where the motion data samples are captured by sensors on the sensor device, sent via the communication interface to the evaluation module on the sensor device to be evaluated, and feedback information is provided by the feedback module on the sensor device. In some embodiments, the communication interface 202 and the modules 204, 206 (or subcomponents of the modules) are implemented on separate devices. For example, the evaluation of form information can be performed on the sensor device, and the processed information is sent to the management device for feedback and display.

Figure 2B:
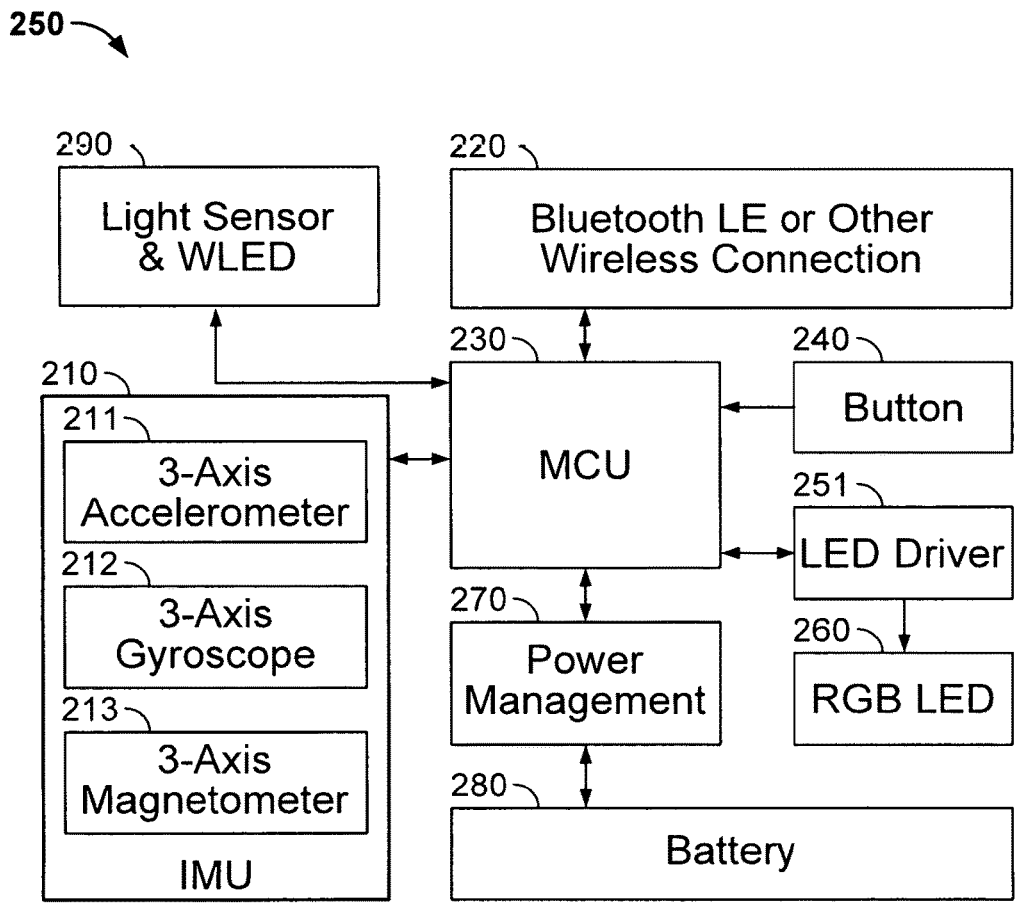
FIG. 2B is a block diagram illustrating an embodiment of a sensor device.

FIG. 2B is a block diagram illustrating an embodiment of a sensor device 250. In this example, sensor device 250 is worn by a user (e.g., on his ankle or on his arm) while he exercises. Sensor device 250 includes an inertial magnetic unit (IMU) which includes a 3-axis accelerometer 211, a 3-axis gyroscope 212, and an optional 3-axis magnetometer 213 that are configured to take sample measurements of the user's motion during the exercise. A single repetition of a motion (e.g., a single step during a running exercise, a single punch during a boxing exercise, a single stroke during a swimming exercise, etc.) may comprise N acceleration samples measured by the accelerometer, N angular velocity samples measured by the gyroscope, and N magnetic field samples measured by the magnetometer (where N is an integer value). In some embodiments, the IMU is implemented using a chipset provided by an electronics manufacturer such as InvenSense®.

In this example, sensor device 250 optionally includes a microcontroller unit 230, with which IMU 210 is connected. In this example, sample measurement data collected by the IMU is offloaded to a management device (e.g., management device 110 shown in FIG. 1) to be further processed. MCU 230 sends and receives data gathered by the IMU through a communication interface 220, which can be a Bluetooth® LE or any other appropriate wireless connection, with a management device such as a smart phone, tablet or PC. In some embodiments, other sensor device designs can be employed. For example, the sensor device can include an onboard processor coupled to the IMU and configured to process the sample measurement data and evaluate the corrected core measurements and/or form measurements locally.

Sensor device 250 optionally includes an RGB LED 260 driven by LED driver 251. The light color and strength of each LED in the RGB LED are controlled by the sensor device itself or the management device, and the color and strength values are set according to the LED manufacturer's specifications. In some embodiments, the LED provides feedback information. For example, when the user is exercising with good form that meets a target, the LED emits green light; when the user is not meeting the target, the LED emits red light. The sensor device also optionally includes a button 240. In various embodiments, the button is multifunctional and can be used as a power on, a switch/sleep mode activator, or a general purpose user interface button. The sensor device also optionally includes a light sensor and white LED 290, which is configured to detect different types of mounting chassis on which the device is mounted. The sensor device 250 also includes a battery 280. The voltage delivered to the other parts of the sensor device is delivered through power management module 270.

In this specification, techniques that apply to circuit training, plyometrics training with free weight or body weight, or other resistance training are described. In some embodiments, a sensor device is mounted on a person and connected to the management device. Motion data is obtained and any post processing such as error correction is performed as appropriate.

Figure 3A:
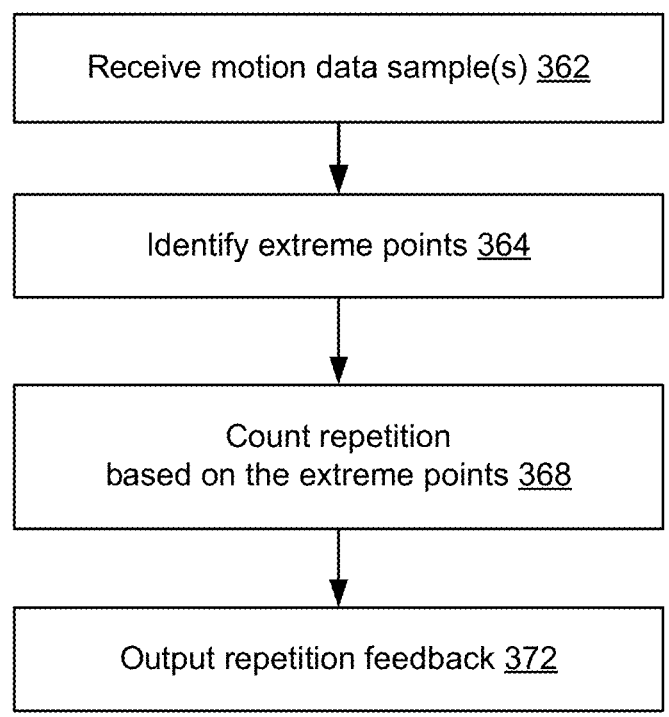
FIG. 3A is a flowchart illustrating an embodiment of a process performed by the automated fitness coaching system.

FIG. 3A is a flowchart illustrating an embodiment of a method 300 performed by an automated fitness coaching system for an exercise (also referred to as a "workout process"). Depending on implementation, the process 300 can be performed by a processor. The functions of the processor can be on a sensor device (such as one or more of the sensor devices 102, 104, and 106 shown in FIG. 1), a management device (such as the management device 110 shown in FIG. 1), or distributed between the sensor device and the management device. That is, in some embodiments, the sensor device includes a processor that performs the data processing, and the data is received via an internal communication interface (e.g., a bus). In some embodiments, the management device includes a processor that performs the data processing, and the data is received at the management device via an external communication interface (e.g., a Bluetooth® LE or other types of wireless connection).

In 362, one or more motion data samples are received. The motion data samples pertain to a set of motions performed by a user. The motion data samples include a set of acceleration data samples taken by the accelerometer, a set of angular velocity data samples taken by the gyroscope, and, optionally, a set of magnetic field data samples taken by the magnetometer. The samples are taken while a user wearing one or more sensor devices is performing a set of exercise motions. For example, while running, the user wears a sensor device on his leg to capture motion data of the leg's movements; while swimming, the user wears a sensor on his arm to capture motion data of the strokes made by the arm, and a sensor on his leg to capture motion data of the kicks made by the leg. Additional sensor devices can be worn so that motion data of both sides of the body is captured.

Figure 6:
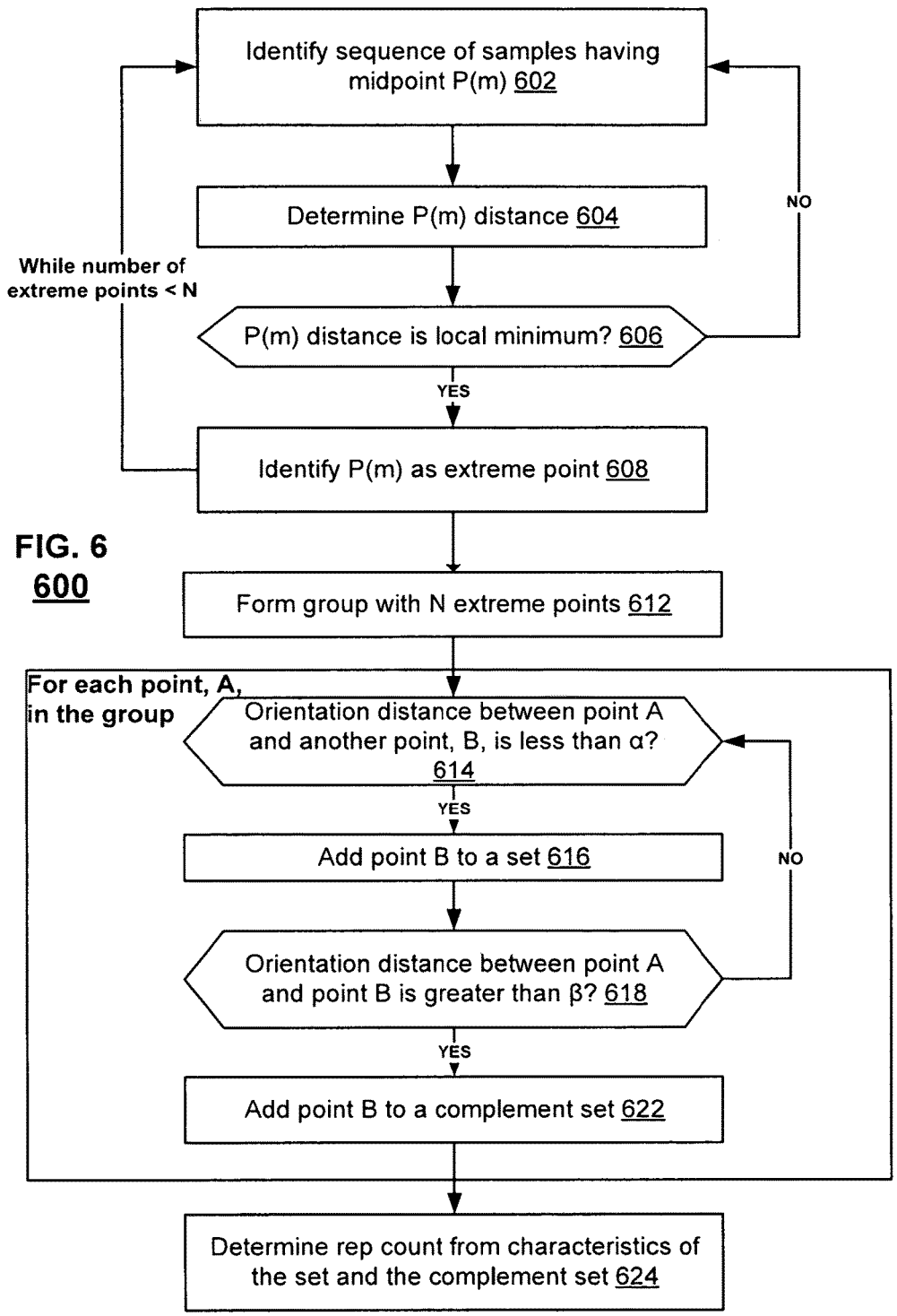
FIG. 6 is a flowchart illustrating an embodiment of a process for determining a number of repetitions of an exercise motion.

In 364, one or more extreme points are identified based on the received motion data samples, as further explained herein with respect to FIG. 6. An extreme point is a point of interest for counting repetitions in a repetitive exercise. For example, one or more sequence of motion data samples can be analyzed to determine an extreme point corresponding to a particular motion.

In 368, a rep is counted. In some embodiments, dynamic motions such as jumping jacks are detected. The sensor sends the user's arm or foot motion to the management device. The management device detects extreme points by comparing the motion path to a target motion path, and determines whether to increase the repetition count. Techniques for counting a repetition are further described in relation to FIGS. 3B and 6.

In 372, feedback regarding one or more repetitions is provided. The feedback can be provided to a user, logged, etc. The feedback may include information about the user's progress such as the current rep count, the total reps completed so far, the number of reps remaining to meet a goal, a number of calories burned so far, and the like. For example, the user may be told and/or shown how much he is off target, and be given tips on how to adjust the movements to achieve target. In some embodiments, a trained feedback model is used to intelligently provide feedback based on the evaluation result. The feedback can be based at least in part on a comparison between a form measurement and a target.

Figure 3B:
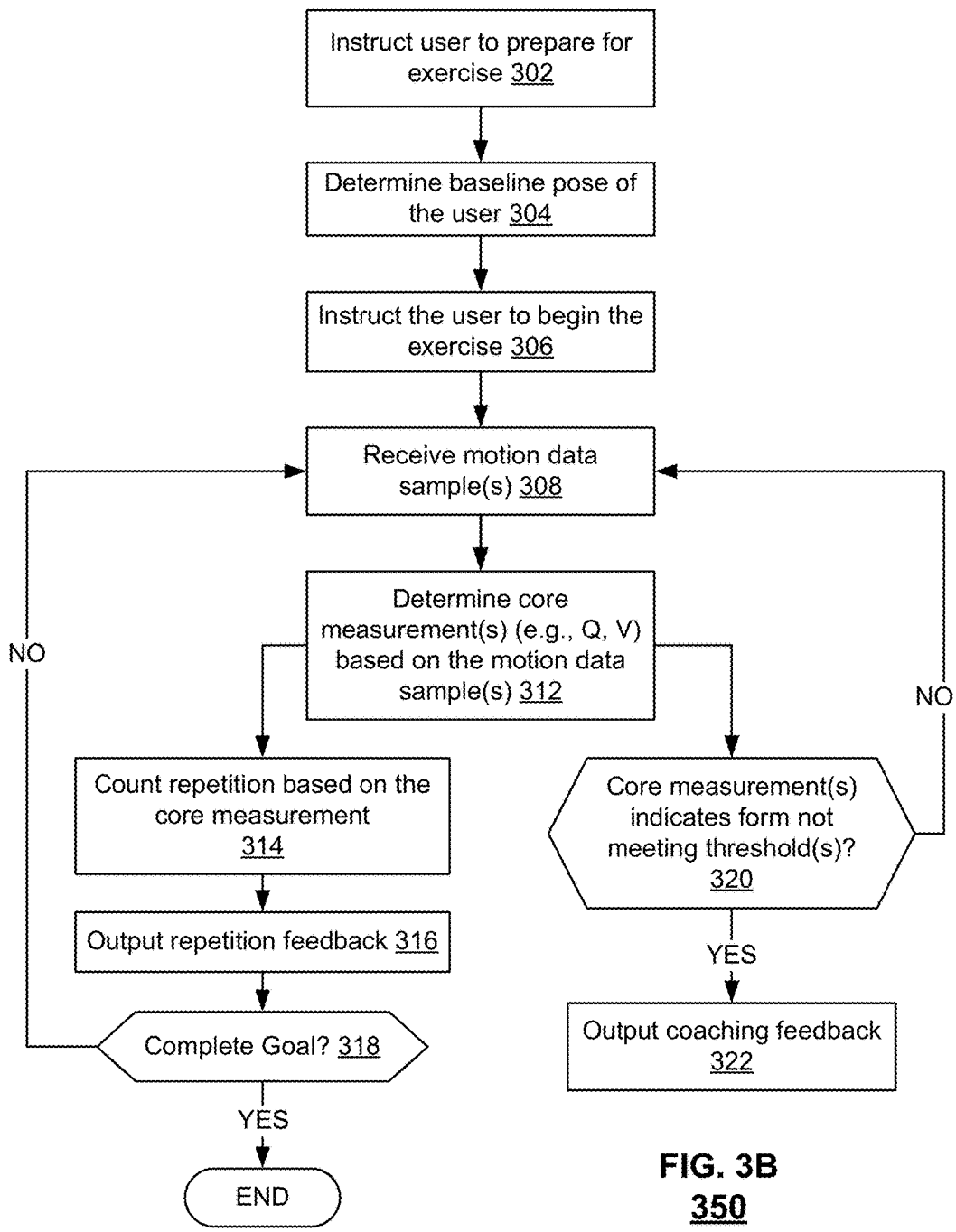
FIG. 3B is a flowchart illustrating an embodiment of a process performed by the automated fitness coaching system.

FIG. 3B is a flowchart illustrating an embodiment of a method 350 performed by an automated fitness coaching system for an exercise. Depending on implementation, the process 350 can be performed by a processor. The functions of the processor can be on a sensor device (such as one or more of the sensor devices 102, 104, and 106 shown in FIG. 1), a management device (such as the management device 110 shown in FIG. 1), or distributed between the sensor device and the management device. That is, in some embodiments, the sensor device includes a processor that performs the data processing, and the data is received via an internal communication interface (e.g., a bus). In some embodiments, the management device includes a processor that performs the data processing, and the data is received at the management device via an external communication interface (e.g., a Bluetooth® LE or other types of wireless connection).

In 302, the user is instructed to prepare for the exercise. The instruction can be provided as a visual signal, an audio signal, a haptic signal, or the like. In some embodiments, the instruction is provided via a user interface using one or more types of signals. For example, a suggested preparation posture is displayed in a graphical user interface. The user is expected to remain substantially static in the preparation posture. The user's position is measured using one or more sensor devices. As described herein, the one or more sensor devices can be placed on the user's body. The sensor device sends the captured motion data to the processor. The processor analyzes the motion data (e.g., speed, orientation) over time to detect if the user is ready for such a preparation phase. For instance, the processor compares the motion data to threshold motion data representing expected posture to determine whether the user is ready for the preparation phase. For example, the user is prepared if the sensed linear and rotational speed is lower than a threshold. As another example, the user is prepared if the sensed position of the user's arm is within a threshold displacement with respect to a desired position such as perpendicular or parallel to the ground.

In 304, a baseline pose of the user is determined. In some embodiments, the baseline pose is used to count the number of reps. The baseline pose may take into account the attributes of a user such as flexibility, strength, and endurance. For example, when the exercise is jumping jacks, a baseline pose is standing with feet together and hands at the side. Reps can be counted based on subsequent returns to this baseline position.

Figure 11:
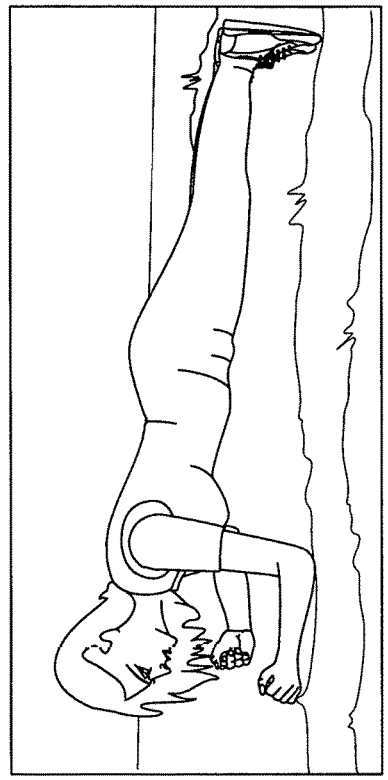
FIG. 11 is an example user interface displaying feedback.

In 306, the user is instructed to begin the exercise. As described herein, the instruction can be provided as a visual signal, an audio signal, a haptic signal, or the like. The user is instructed to begin the exercise, e.g., start the workout. In an embodiment, the workout is a dynamic motion, where the user moves between a plurality of states. For example, for a jumping jack, the user moves back and forth between two states: first standing with feet together and hands by the side, then standing with feet apart and hands over the head. A user typically transitions between the two states by jumping from one to the other in a continuous motion. One cycle through the two states is counted as one rep. When performing different exercises (e.g., sit-ups, push-ups, etc.), the user may transition between different states. In another embodiment, the workout is a static motion such as a plank. FIG. 11 shows one example of a "plank" static exercise. In yet another embodiment, the workout includes a sequence of exercises, which includes a combination of dynamic and static motions.

In 308, one or more motion data samples are received. The motion data samples pertain to a set of motions performed by a user. The motion data samples include a set of acceleration data samples taken by the accelerometer, a set of angular velocity data samples taken by the gyroscope, and, optionally, a set of magnetic field data samples taken by the magnetometer. The samples are taken while a user wearing one or more sensor devices is performing a set of exercise motions. For example, while running, the user wears a sensor device on his leg to capture motion data of the leg's movements; while swimming, the user wears a sensor on his arm to capture motion data of the strokes made by the arm, and a sensor on his leg to capture motion data of the kicks made by the leg. Additional sensor devices can be worn so that motion data of both sides of the body is captured.

In 312, one or more core measurements are determined based on the received motion data sample(s). The core measurements are measurements associated with a subset of the user's motions. The processing by the evaluation module can include correcting the core measurements by removing or reducing any inaccuracies in the data samples received from the sensors. The core measurements measure the user's body positions while he performs the subset of motions. In some embodiments, the core measurements include a velocity (expressed as a vector V) and an orientation (also referred to as a quaternion, and expressed as a vector Q). Other corrected core measurements can be determined.

Since exercise motions are often repetitive, in some cases, each core measurement measures the body positions of the user during a single repetition of the exercise motions (e.g., a single step during running, a single stroke during swimming, a single punch during boxing, etc.). Optionally, one or more form measurements measuring the user's form during the single repetition are derived based on the core measurement data. Examples of form measurements include cadence, stride, range of motion, efficiency, speed, landing impact, pronation, etc. The form measurements can be instantaneous measurements of a single motion rather than averages of a series of motions. For example, the user's instantaneous stride is determined by measuring how much time it takes for him to run a single step, and the cadence is the reciprocal of the stride; the user's instantaneous range of motion is determined by measuring the maximum angular motion of his leg between the most forward and most backward positions; the user's instantaneous efficiency is determined based on the energy concentration of the angular velocity; the user's instantaneous speed is determined based on velocity; the user's landing impact is determined based on acceleration; the user's pronation is determined based on the orientation, and so on. As discussed above, the evaluation can be performed by the sensor device or by the management device. In some embodiments, multiple form measurements are used to further derive other form information, such as the average, mean, maximum, minimum, standard deviation, etc. In some embodiments, the core measurements are used directly as form measurements. For example, during a boxing exercise, the velocity and orientation measurements are used to measure the user's form in delivering a punch. Details of how to evaluate a measurement using at least some of the set of motion data samples are discussed below.

In some embodiments, the core measurements obtained by the evaluation module are directly compared with certain targets. For example, the velocity and rotation of a punch motion performed by the user are compared with those of a pre-recorded punch motion performed by a coach. In some embodiments, the derived form measurements are compared with a target. For example, the cadence, range of motion, etc., can be compared with pre-specified target goals. In some embodiments, the targets are specified by the user manually or by the system automatically. In some embodiments, the targets are specified for a particular set of exercises and/or as a part of a coached workout program.

The following is an example technique of evaluating a set of corrected core measurements of the user's body positions during a subset of motions using the motion data samples obtained from sensors. In this example, each input to the evaluation module includes a set of sensor output sample data in an object space, including: an accelerometer output that measures acceleration and is represented as Ax, Ay, Az (or a vector A for short), the units of the acceleration vector being in m/s$^2$ or in gravity units; a gyroscope output that measures the angular velocity and is represented as Gx, Gy, Gz (or a vector G for short), the units of the angular velocity vector being in rad/s or degree/s; and an optional magnetometer output that measures the magnetic field and is represented as Mx, My, Mz (or a vector M for short), the units of the magnetic field vector being in Gauss or Tesla.

The reference space of the measurements is a world space coordinate system. Specifically, the world space coordinate system is represented as Xw, Yw, Zw, where the Zw axis (0, 0, 1) corresponds to gravity direction; the Xw axis (1, 0, 0) corresponds to North direction (i.e., the magnetic north on a horizontal plane); and the Yw axis (0, 1, 0) is the cross product of Zw and Xw.

As will be described in greater detail herein, an evaluation module such as 400 of FIG. 4 performs a process such as process 500 of FIG. 5A to obtain one or more of the following outputs: a velocity in world space, represented as Vx, Vy, Vz (or a vector V for short); an acceleration in world space, represented as (Ax, Ay, Az)w (or a vector Aw for short); a rotational velocity in world space and local space, represented as (Rx, Ry, Rz)w and (Rx, Ry, Rz)o, respectively (or vectors Rw, Ro for short); a quaternion (the quotient of two vectors) describing how to transform from a point in the local space to world space (e.g., the orientation and rotation) and another quaternion representing the world space to local space transformation, represented as (Qx Qy Qz Qw)o→w (or vector Q for short) and (Qx Qy Qz Qw)w→o (or vector Qw for short), respectively; or the relative position in world space, represented as (Px, Py, Pz) (or vector P for short).

In some embodiments, the corrected core measurements include the velocity vector V and the quaternion vector Q, and are processed further (e.g., by higher level software applications) to count a number of repetitions, give the user feedback, coaching tips, etc. Given V and Q, other outputs can be computed. For example the relative position can be computed as P(n)=V(n)*time_step; Qw is the inverse of Q; Rw=Ro*Q.

In 314, a rep is counted. In some embodiments, dynamic motions such as jumping jacks are detected. The sensor sends the user's arm or foot motion to the management device. The management device detects extreme points by comparing the motion path to a target motion path, and determines whether to increase the repetition count. Techniques for counting a repetition are further described in relation to FIG. 6.

In 316, feedback regarding one or more repetitions is provided. The feedback can be provided to a user, logged, etc. The feedback may include information about the user's progress such as the current rep count, the total reps completed so far, the number of reps remaining to meet a goal, a number of calories burned so far, and the like. For example, the user may be told and/or shown how much he is off target, and be given tips on how to adjust the movements to achieve target. In some embodiments, a trained feedback model is used to intelligently provide feedback based on the evaluation result. The feedback can be based at least in part on a comparison between a form measurement and a target.

In 318, whether the user has completed a goal is determined. A goal may be met if a condition has been met, e.g., a number of reps have been completed, a duration has elapsed, and the like. If the user has met the goal, the method 350 terminates. Otherwise, the method 350 returns to 308 to receive additional motion data sample(s).

In some embodiments, the method 350 determines whether there is a time out (not shown). A time out can be triggered by sensor readings indicating that the user is substantially static, the user is in some unexpected position, or the user provides a signal such as a vocal command or a touch command for a time out. In some embodiments, a time out can be triggered when a sensor runs out of power or is malfunctioning. In some embodiments, a time out is a pause and when exercise resumes, reps are counted from the next number in the sequence prior to the pause. In other embodiments, a time out may be an end to the counting of reps and cause a counter to be reset.

In 320, whether the core measurement(s) indicate that the user's form is not meeting a threshold ("poor form" for simplicity) is determined. For example, the motion data samples can be determined to be below a threshold. As another example, the motion data samples can be determined to be above a threshold. The poor form can indicate that the user is fatigued. As shown, in some embodiments, the detection of poor form is performed in parallel with counting repetitions, and the reps continue to be counted. In alternative embodiments, a rep of poor form is not counted towards the goal or is counted partially towards the goal. If the core measurement(s) do not meet the threshold, in 322, coaching feedback is output. Otherwise, if the core measurement(s) do meet the threshold, the method 350 returns to 308 to receive and process additional motion data sample(s).

The coaching feedback output in 322 can include advice such as how to adjust positions to match a target posture. The coaching feedback can include motivation such as encouragement. The coaching feedback can be adapted to a particular user.

FIG. 3B is an example process for counting repetitions in a dynamic exercise. The process also finds application for other types of exercises such as static exercises and exercises including periods of movement and periods of stillness. For example, process 350 can evaluate a static exercise by measuring a duration of a static position in 314 rather than counting a repetition. The measurement can be tracking the time of holding a position. The sensor sends the user's body motion to the management device. The management device detects any linear and/or rotational speed. To count the time of holding the position towards a goal, the detected speed should be lower than a threshold. The method can provide feedback regarding the length of time that the user has held a particular position, the level of completion towards the goal, and motivation when the detected speed indicates the user has poor form or is not performing as desired (e.g., as defined by a target position).

Figure 4:
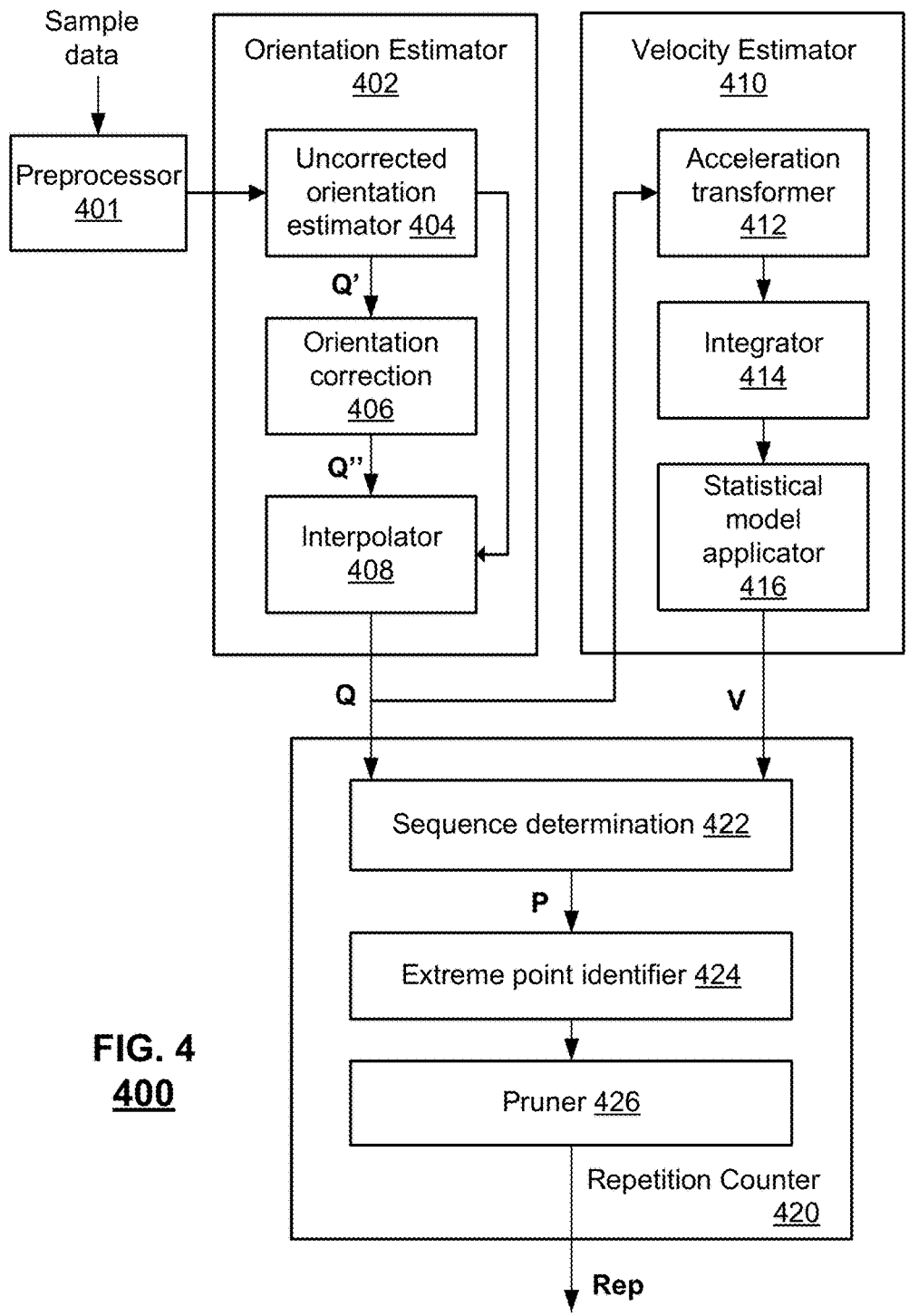
FIG. 4 is a block diagram illustrating an embodiment of an evaluation module.

FIG. 4 is a block diagram illustrating an embodiment of an evaluation module. The evaluation module 400 includes a preprocessor 401, an orientation estimator 402, a velocity estimator 410, and a repetition counter 420. The evaluation module 400 can be part of a system such as the system 200 shown in FIG. 2A.

The preprocessor 401 transcodes data received on an interface (such as the communication interface 202 shown in FIG. 2A) to normalized space, aligns the axis, and performs initial calibrations on accelerometer, gyroscope, and magnetometer measurements. Conventional techniques for transcoding, alignment, and calibration can be used. In some embodiments, the preprocessor 401 further performs interpolation on received samples to estimate any sample data that may have been lost or corrupted during transmission.

The orientation estimator 402 receives the preprocessed sample data and outputs an orientation, Q(n). In the example shown, the orientation estimator 402 includes an uncorrected orientation estimator 404, an orientation correction module 406, and an interpolator 408. The orientation estimator 402 determines an uncorrected current orientation of the current sample, Q'(n). The orientation correction module 406 corrects Q'(n) based on a calibrated accelerometer output and, optionally, the magnetometer output, and generates a corrected current orientation Q"(n). The interpolator 408 interpolates the current sample Q'(n) and the corrected current orientation Q"(n) to generate an interpolated current orientation Q(n).

The velocity estimator 410 receives the orientation, Q(n), and outputs a velocity, V. In the example shown, the velocity estimator 410 includes an acceleration transformer 412, an integrator 414, and a statistical model applicator 416. The acceleration transformer 412 transforms the acceleration reading in world space based on the estimated orientation, and removes the gravity vector to determine an absolute acceleration in world space. The velocity estimator 410 further includes an integrator 414 that determines an uncorrected velocity based on integrating velocity samples and acceleration. The statistical model applicator 416 applies a statistical model to the output of the integrator to generate an error-corrected velocity estimation.

The repetition counter 420 receives the orientation, Q(n), and velocity, V(n), and outputs a number of repetitions based on the received information according to the techniques further detailed herein. The sequence determination module 422 identifies one or more sequences, P(n), based on the orientation and velocity data. The extreme point identifier 424 evaluates one or more of the sequences to determine whether a midpoint of a sequence is an extreme point. An extreme point is a point of interest for counting repetitions. The pruner 426 removes an extreme point from being considered for counting repetitions as appropriate. The repetition counter 420 outputs a final repetition count. The output can be dynamic, providing a user with feedback upon completion of each repetition or periodically. Alternatively, the output can be provided when a goal is met.

In operation, motion data samples are preprocessed and sent to an orientation estimator 402 to estimate an orientation, apply corrections to the estimate orientation, and interpolate the orientation to generate an orientation Q(n). The output of the orientation estimator is sent to a velocity estimator 410 to estimate a current velocity. The orientation is sent to the acceleration transformer 412 of the velocity estimator 410. The acceleration transformer transforms the orientation to an acceleration reading. The integrator 414 determines a velocity based on the acceleration, and the statistical model applicator 416 applies error-correction to the velocity and outputs an error-corrected estimate of the velocity, V(n). The repetition counter receives the orientation and velocity data and identifies a sequence of position data points, P(n). The repetition counter determines one or more extreme points from the position data points, optionally prunes one or more of the extreme points, and identifies one or more repetitions from the extreme points as further detailed herein.

Figure 5A:
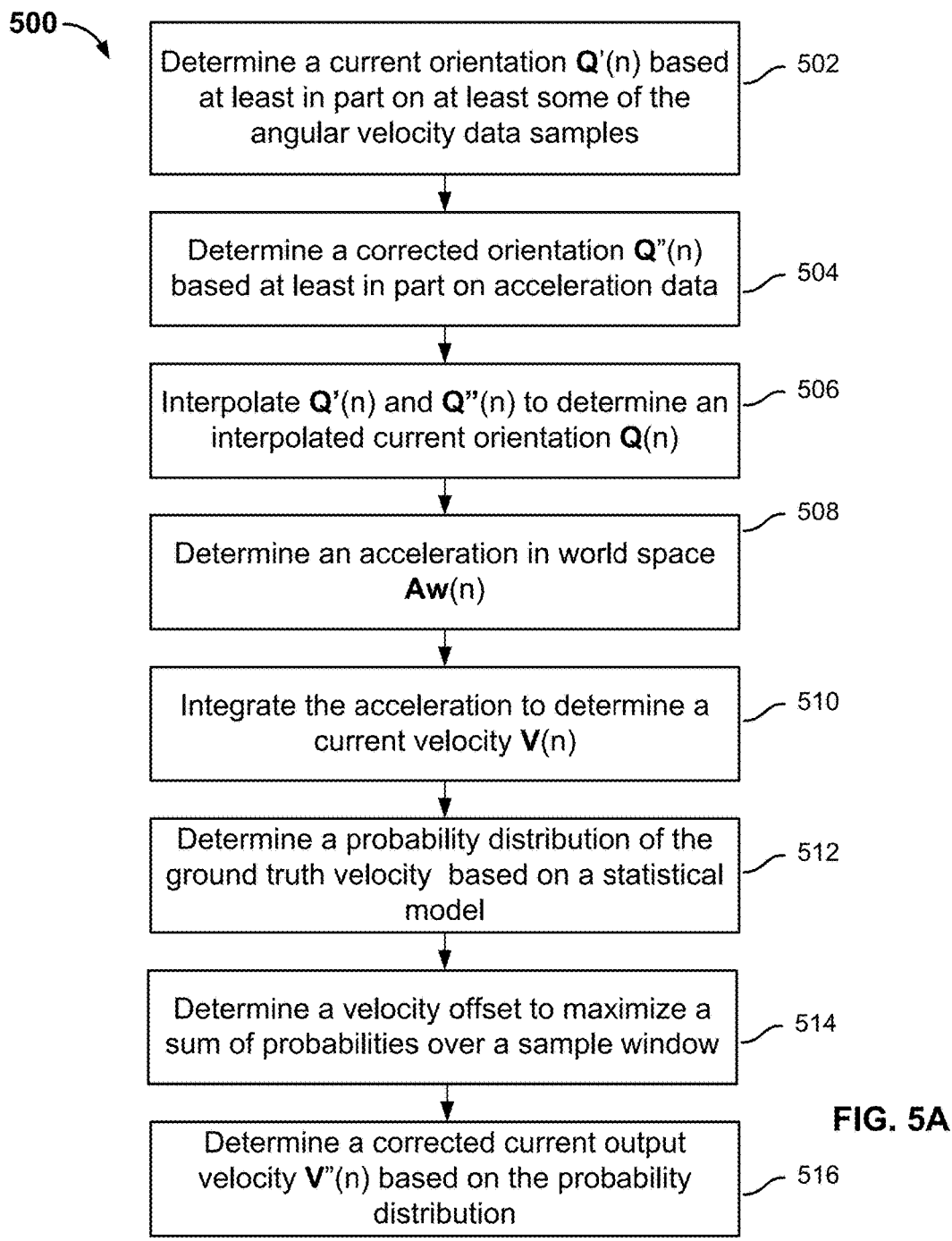
FIG. 5A is a flowchart illustrating an embodiment of a process for transforming sensor outputs and determining form measurements.

FIG. 5A is a flowchart illustrating an embodiment of a process for transforming the sensors' outputs and determining form measurements. Process 500 corrects for errors in the raw sensor outputs to generate more accurate form information. Process 500 can be performed as part of another process, and is used to implement 312 of FIG. 3B in some embodiments. Process 500 is used to implement 204 of FIG. 2A in some embodiments. Process 500 can be performed by a processor, wherein the functions of the processor can be on a sensor device (such as the sensor devices 102-106), a management device (such as the management device 110), or divided between the sensor device and the management device.

In some embodiments, the sensors are calibrated and initialized by a preprocessor. For example, the sensors can have offsets due to imperfections in their hardware. An initial calibration process adjusts for such offsets and errors. In some embodiments, the initial calibration process is performed by the manufacturer of the sensor device. A set of calibration functions with certain calibration parameters is applied to the raw sensor outputs A, G, and M to obtain calibrated and initialized outputs Ai, Gi, and Mi as follows:

$$Ai = \text{calibration}_{Ai}(A, \text{calibration\_parameters}) \quad (1)$$

$$Gi = \text{calibration}_{Gi}(G, \text{calibration\_parameters}) \quad (2)$$

$$Mi = \text{calibration}_{Mi}(M, \text{calibration\_parameters}) \quad (3)$$

The actual calibration functions and calibration parameters are determined empirically and may vary in different implementations. For example, the calibration function can subtract certain offsets from a raw output, multiply the raw output by a constant, etc.

Corrected orientation data is determined based at least in part on the angular velocity data, the acceleration data, and the magnetic field data if available. Preferably, preprocessed data based on the raw measurements is used. At 502, the current orientation (of the current sample n) is determined based at least in part on the angular velocity data samples (gyroscope reading Gi), which have a linear relationship to local space rotational velocity Ro. In this example, Gi is the same as Ro, although other linear relationships may exist between the two in other embodiments. Specifically, the current orientation data sample (expressed as the quaternion Q'(n), n being the sample index or time index) is updated by performing a quaternion transform operation on the previous interpolated orientation data sample Q(n−1) and the current local space rotational velocity Ro(n) as follows:

$$Q'(n) = \text{transform}_Q(Q(n-1), Ro(n), \text{time\_step}) \quad (4)$$

where $\text{transform}_Q$ is a standard quaternion transform function.

If left uncorrected, the output Q'(n) will drift over time. Thus, at 504, a corrected orientation Q''(n) is determined based at least in part on the acceleration data. In particular, the preprocessed acceleration data Ai and the preprocessed magnetic field data Mi are used in the determination. Specifically, Ai and Mi form a local coordinate system relative to the world coordinate system. The local coordinate system is a coordinate system that is relative to the device itself. The rotational transform of the world space to the local coordinate system is expressed as Q''(n) and derived as follows:

First, a 3×3 rotational matrix Mr is constructed from Ai and Mi, where $$vec3Y = \text{normalize}(Vec3::Cross(Mi, Ai)); \quad (5a)$$

$$vec3X = \text{normalize}(Mi); \quad (5b)$$

$$vec3Z = \text{normalize}(Ai); \quad (5c)$$

$$Mr.\text{column1}.x = X.x; \quad (5d)$$

$$Mr.\text{column1}.y = Y.x; \quad (5e)$$

$$Mr.\text{column1}.z = Z.x; \quad (5f)$$

$$Mr.\text{column2}.x = X.y; \quad (5g)$$

$$Mr.\text{column2}.y = Y.y; \quad (5h)$$

$$Mr.\text{column2}.z = Z.y; \quad (5i)$$

$$Mr.\text{column3}.x = X.z; \quad (5j)$$

$$Mr.\text{column3}.y = Y.z; \quad (5k)$$

$$Mr.\text{column3}.z = Z.z; \quad (5l)$$

Then, rotational matrix Mr is then converted to a quaternion Q''(n) using a standard mathematical transform.

At 506, an interpolated and corrected current orientation Q(n) is determined by interpolating Q'(n) and Q''(n). Any known interpolation function can be used. In some embodiments, a weighted linear interpolation function is used as follows:

$$Q(n) = \text{interpolate}(Q'(n), Q''(n), \text{alpha}) \quad (6)$$

Typically, 0<alpha<1. The weight alpha is based on the stableness of the raw sensor reading. The more stable the reading is, the greater the weight is assigned to Q"(n). In some embodiments, the stability of the sensor reading is determined based on a probability distribution (discussed in greater detail below in connection with step 512). A more concentrated probability distribution indicates greater stability and corresponds to a greater weight.

The corrected velocity is determined based at least in part on Q(n) and a statistical model. At 508, an acceleration in world space, Aw(n), is determined. Since the accelerometer reading includes the earth's gravity, the transform function transforms the acceleration reading in world space Ai(n) based on the estimated orientation, and then removes gravity from the transformed value to determine the acceleration in world space as follows:

$$Aw(n)=\text{transform}_v(Ai(n),Q(n))-\text{gravity} \quad (7)$$

where transform$_v$ is a standard vector transform that transforms Ai to a new direction according to Q.

At 510, the acceleration is integrated to determine a current velocity V(n) as follows:

$$V(n)=V(n-1)+Aw(n)*\text{time\_step} \quad (8)$$

If left uncorrected, velocity V(n) will drift over time. Thus, a statistical model is used to remove the accelerometer's bias or zero offset, and minimize errors in velocity estimation.

In some embodiments, the statistical model is a distribution model of sensor output features to ground truth human motion velocity. The motion data of various human users wearing various sensors and performing exercises is captured using a system that is independent of the sensors and that is known to produce accurate measurements. For example, a camera-based system is used in some embodiments to capture sample position data of the users' leg movements. Multiple position data can be captured for a single action such as a single step. To build the model, sample data of many steps taken by many different users wearing different sensors is captured. The sample position data may be further processed to accurately derive other data such as velocity associated with these motions. In particular, the velocity that is determined using the independent system is referred to as "ground truth velocity." Meanwhile, the sensors also capture data, and a set of sensor output features derived based on the sensors' outputs is determined. Examples of the sensor output features include the statistical variance, frequency, and magnitude of the captured sensor data. The features characterize the motions being performed. For example, a slow motion tends to correspond to a low variance in the sensor output data, and a fast motion tends to correspond to a high variance in the sensor output data.

At 512, a probability distribution of the ground truth velocity for a specific sensor output feature is determined based on a statistical model for the given sensor output feature. Examples of a sensor output feature include frequency, variance, standard deviation, and any other appropriate characteristics derived from the acceleration data, the angular velocity data, and/or magnetic field data. In some embodiments, the sensor output feature is a vector in multiple dimensions where each dimension corresponds to a particular feature of a particular type of sensor output (e.g., the frequency for acceleration data). The probability distribution function is expressed as P (Vg, sensor_feature).

Figure 5B:
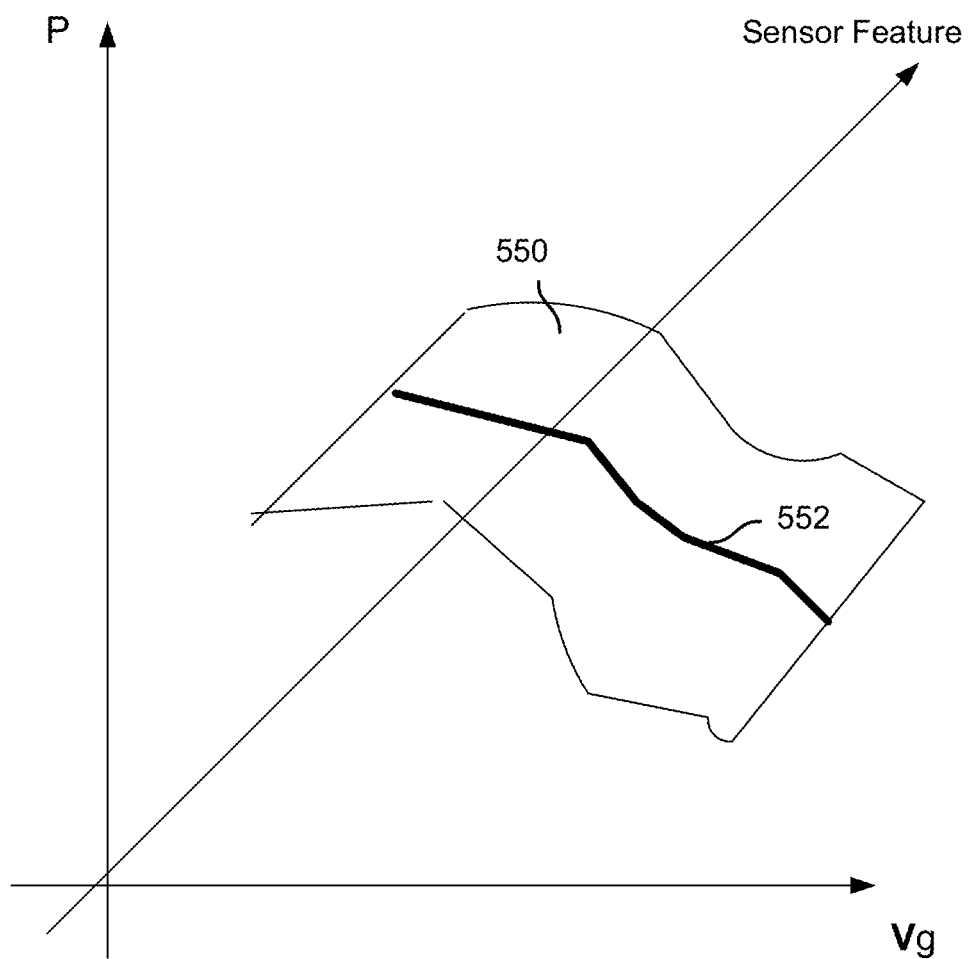
FIG. 5B is a diagram illustrating an example statistical model of ground truth velocities relative to a specific sensor output feature in a single dimension.

FIG. 5B is a diagram illustrating an example statistical model of ground truth velocities relative to a specific sensor output feature in a single dimension. In this example, the sensor output feature corresponds to the frequency of one set of sensor measurement data (e.g., as determined by performing an operation such as a Fourier transform on the sensor measurement). Other sensor output features such as variance, standard deviation, etc. can be used and correspond to different statistical distribution functions. Specifically, the statistical model in this example is represented as a 3-D surface 550 that corresponds to function P (Vg, sensor_feature). Given this distribution function, for a given frequency, there is a corresponding probability distribution of ground truth velocities (e.g., function curve 552). Accordingly, for each sample point, there is a corresponding sensor output feature value, and a corresponding distribution of possible human velocity, expressed as Px' (Vg), where x is the sample index. Further, given the probability distribution P, there is a corresponding preset alpha that is set based on how stable the distribution is, which is used in the interpolation function (6).

Returning to FIG. 5A, at 514, an offset of the velocity is determined such that the sum of probabilities for n over a sample window of (n0, n1) is maximized, as follows:

$$\text{Maximize}\left(\sum_{n=n0}^{n1} P'_n(V(n)-Voff(n))\right) \quad (9)$$

where Voff(n)=a*n+b, where n is the sample index or time. An optimization algorithm such as a search-based optimization or any other appropriate optimization algorithm is used to solve for a and b to maximize the sum of the corrected probability values over the window n0 and n1. The window size is preferably set to the average time for a typical user to perform a motion (e.g., if it takes on average 0.5 seconds to perform a motion and the sample rate is 100 samples/second, then the window size is preferably set to 0.5*100=50 samples).

At 516, the corrected current output velocity V"(n) is capped based on the current output feature's distribution at the current sample point and the offset as follows:

$$V''(n)=\text{Normalize}(V'(n))*\text{Min}(\text{magnitude}(V'(n)),\text{Vmax\_magnitude}(n)) \quad (10)$$

where V'(n)=V(n)−Voff and Vmax_magnitude(n) is the maximum velocity the motion can reach based on the current sensor output features with a certain degree of confidence or probability. For example, it is 99% likely that the user cannot reach more than two meters per second with this motion pattern.

Although the example process above includes a magnetometer measurement, the magnetometer measurement is optional. For example, a coordinate system can still be built without the magnetometer measurement, even though information about the North direction is lost and the horizontal direction cannot be determined. In practice, the coaching system can still give the user feedback on his form by arbitrarily selecting a north direction.

The automated fitness coaching system is often implemented in a lossy environment where some samples transmitted from the sensor device to the management device can be lost. An index-based transmission technique is implemented in some embodiments to make corrections in the event of data loss. In some embodiments, each set of sensor outputs (A, G, and optionally M) is transmitted with a sample index that increments from an initial value to a maximum value (e.g., from 0 to 255), then resets to the initial value, so that the receiver (e.g., the management device) can track and repair lost packets or samples. If one or more samples are lost, the sample points are interpolated based on the samples before and after the lost ones such as the following:

$$S(\text{lost})=\text{Interpolate}(S(\text{lost}-1),S(\text{lost}+1),0.5) \quad (11)$$

The above example interpolation function is a linear interpolation function. Different interpolation techniques can be used in other embodiments.

In some embodiments, the management device is installed with different applications for different types of exercises. The user may select an appropriate application for the specific exercise he is doing. The application determines, based on sensor measurements and using a process such as 500 described above, corrected core measurements for velocity, orientation, etc. In some embodiments, the corrected core measurements are further processed to derive additional corrected core measurements (e.g., acceleration) and/or additional form measurements such as cadence, range of motion, landing impact, etc.

Motion data such as Q(n) and V(n) can be used to count a repetition according to the techniques described herein. Techniques include analyzing motion data to identify orientation and velocity and using the orientation and velocity to identify extreme points, where the extreme points correspond to transition points in user motion. The extreme points can be grouped into a group and a complement group. A transition from one group to a complementary group that includes a change of direction constitutes a phase, and two phases make up a repetition. In some embodiments, extreme point detection includes finding extreme point candidates by comparing an orientation distance to a neighboring segment and pruning the extreme points.

FIG. 6 is a flowchart illustrating an embodiment of a method 600 performed by an automated fitness coaching system. In some embodiments, the process 600 is performed as part of another process. For example, the process 600 can be used to determine repetitions (314 shown in FIG. 3B). In some embodiments, determining a repetition includes counting or keeping track of a number of repetitions.

In 602, one or more samples forming a sequence are identified. The sequence can be defined with respect to a midpoint sample, P(m). FIG. 7A shows example samples on a two-dimensional plane in space. FIG. 7A shows an example of a sequence of samples P(m−n1) P(m−2), P(m−1), P(m), P(m+1), P(m+2), P(m+n2). Although called a "midpoint" sample, P(m) may have a number of preceding samples unequal to a number of subsequent samples. For example, in some embodiments, n1 does not equal n2. In alternative embodiments, n1=n2. The techniques described herein apply to both situations. The one or more samples can be based on a sensor reading. For example, P(m) can be defined as (Qm, Vm), where Q corresponds to rotational state and is represented as a velocity in some embodiments. As described herein, Q is a quaternion representing the world space to local space transformation, represented as (Qx Qy Qz Qw)o→w, and V is a velocity in world space, represented as Vx, Vy, Vz (or a vector V for short).

Returning to FIG. 6, in 604, a distance for P(m) is determined by calculating a distance between a sample preceding P(m) and a corresponding sample succeeding P(m). For instance, the method 600 compares a distance 702 between the orientation of sample P(m−1) and the orientation of P(m+1). This distance is called "orientation distance" for simplicity. In this example, the orientation distance corresponds to the angle between two orientations or its cosine value. The distance for P(m) can be defined in terms of the sum of the distances between corresponding pairs of samples surrounding P(m):

$$\text{distance}(P(m))=\text{orientation\_distance}(Q(m-n),Q(m+n))+\ldots+\text{orientation\_distance}(Q(m-1),Q(m+1)) \quad (12)$$

In 606, whether the P(m) distance is a local minimum over the sequence is determined. The details of determining whether a P(m) is a local minimum are discussed herein with respect to FIG. 7A. If P(m) is a local minimum, in 608, P(m) is identified as an extreme point. In the example shown, the method 600 returns to 602 to continue to identify other sequences while the number of extreme points is below a threshold, N. The threshold N can be a predefine value. For example, N can be defined as appropriate for a sampling rate used to obtain the motion samples. If the method 600 does not identify P(m) as a local minimum at 606, the method 600 may return to 602 to continue to identify other sequences.

Upon identifying at least N extreme points, the method 600 proceeds to 612, in which a group of extreme points is evaluated. In some embodiments, threshold values, alpha (α) and beta (β), are used to classify the extreme points into sets. As used herein, alpha corresponds to a tolerance for a range of one set of extreme points. Beta corresponds to a minimum range of motion performed for the motion to count as a repetition. In some embodiments, alpha and beta are determined based on corresponding movements. Alpha and beta can each be defined within a range, e.g. 0 to π. Alpha and beta can be used to group the points into two sets: a first set with points that have "small" orientation distances (e.g., less than the minimum threshold defined by alpha) and a complement set of points whose orientation distances relative to points in the first set are "large" (e.g., greater than the maximum threshold defined by beta). Using the example of monitoring hand position during jumping jacks, one set of extreme points corresponds to a spatially high point and another set of extreme points corresponds to a spatially low point.

In 614, the method determines whether an orientation distance between a point (e.g., point A) in the group and another point (e.g., point B) in the group is less than threshold alpha. The points being within the threshold alpha may indicate that they are sufficiently close to a desired position that is defined as good form for an exercise. If the orientation distance between point A and point B is not less than the threshold alpha, the method can evaluate another point (not shown for simplicity).

If the orientation distance between point A and point B is less than the threshold alpha, in 616, the method 600 adds point B to the "small" set. If there are no other members in the set, point A can also be added to the set. The points belonging to the small set are those points that are sufficiently close to a desired position that is defined as good form for an exercise. Using the example of monitoring hand position during jumping jacks, points in the small set correspond to the hand being at the side of the body.

In 618, the method determines whether an orientation distance between point A and point B is greater than threshold beta. If the orientation distance between point A and point B is not greater than the threshold beta, the method can evaluate another point (not shown for simplicity). If the orientation distance between point A and point B is greater than the threshold beta, in 622, the method 600 adds point B to the complement set (also called the "large" set). The points belonging to the large set are those points that depart from an initial position in a manner that is defined as good form for an exercise. Using the example of monitoring hand position during jumping jacks, points in the large set correspond to the hand being over the head. One effect of the definition of alpha and beta is that if elements do not satisfy the thresholds defined by alpha and/or beta, the repetition count is not increased. For example, an extreme point that occurs outside of the range defined by alpha is not used to increase the repetition count. In other words, the extreme point is deemed to be associated with a motion that is not sufficiently precise for the motion to qualify as a repetition. For an exemplary type of exercise such as jumping jacks, a switch in the path traveled from the set to its complement is a phase and two phases constitute a rep (a complete back and forth motion that starts and ends in a region as defined by alpha). Also, the range of motion has to be sufficiently large, as defined by beta. 614-22 can be repeated for each of the N points in the group. In 624, the method 600 identifies switches in paths between points in the set and points in the complement set, identifies phases, and counts reps based on the identified phases.

Method 600 will now be explained with reference to FIGS. 7B-7E. FIG. 7B shows a sequence of user positions in a jumping jack exercise. From left to right, the first position is hands at the side, feet together. The second position is hands up, legs apart. The third position is substantially the same as the first position. The fourth position is substantially the same as the second position. The fifth position is substantially the same as the first position. One rep is completed when the user position begins with hands at the side, feet together; transitions to hands up, legs apart; and returns to hands at the side, feet together. As a user moves between each of the positions, a sensor can detect the orientation and velocity corresponding to each of the positions. This information can be used to derive the P distances according to the techniques described herein. For example, the sensed data can be processed to determine a number of repetitions and a distance for P(m) is determined by calculating a distance between a sample preceding P(m) and a corresponding sample succeeding P(m).

FIG. 7C shows the P distance corresponding to each of the positions shown in FIG. 7B as plotted over time. The method 600 determines the local minimums of the P distances. These P distance local minimums are labelled E1-E5. A P distance can be determined to be a local minimum if the value of the P distance is less than the values of other P distances within a set of P distances. In some embodiments, when the points are obtained in real time, the method 600 picks the last N points to detect any new reps. In the example shown in FIG. 7C, N=5, so E1-E5 are picked for the analysis.

FIG. 7D shows a scalarized version of the orientation, Q, over time and corresponding to each of the extreme points E1-E5. FIG. 7D also shows the threshold values, alpha and beta. The method 600 analyzes the Q values of each of the extreme points E1-E5 to classify the points into sets. One set has orientation distances with respect to other set members below threshold alpha. A complement set has orientation distances with respect to other set members above threshold beta. The set is made up of E1, E3, and E5. The complement set is made up of E2 and E4.

FIG. 7E also illustrates the concept of the sets. The points illustrated in this figure correspond to motion through two-dimensional space as captured by a sensor on a body of a user. Set 1 is the complement set and Set 2 is the small set. FIG. 7E shows the end state of the sets after the following steps. Beginning with E1, E1 is placed in the small set. The method 600 determines that the orientation distance between E1 and E2 is above threshold beta, and accordingly places E2 in the complement set. The method 600 determines that the orientation distance between E1 and E3 is below threshold alpha, and accordingly places E3 in the small set. The method 600 determines that the orientation distance between E1 and E4 is above threshold beta, and accordingly places E4 in the complement set. The method 600 determines that the orientation distance between E1 and E5 is below threshold alpha, and accordingly places E5 in the small set. In summary, in this example, E1, E3, E5 form a set because: (i) the orientation distance between E1 and E3 is less than alpha, (ii) the orientation distance between E3 and E5 is less than alpha, (iii) the orientation distance between E1 and E2 is greater than beta, (iv) the orientation distance between E2 and E3 is greater than beta, (v) the orientation distance between E3 and E4 is greater than beta, and (vi) the orientation distance between E4 and E5 is greater than beta.

FIG. 7E shows the path taken from the extreme points in temporal order. For the example of jumping jacks, the sensor can determine the direction of movement in one dimension. When there is a change of direction, e.g., the arm changes from moving upwards to moving downwards, this can be identified as a "switch." The switch from E1 to E2 is a phase; the switch from E2 to E3 is another phase, and these two phases (from E1 to E2 then to E3) form a rep. The switch can be detected by the sensors. Similarly, the sequence E3 to E4 to E5 is another rep. In summary, the five points, E1-E5 form two reps.

Figure 7F:
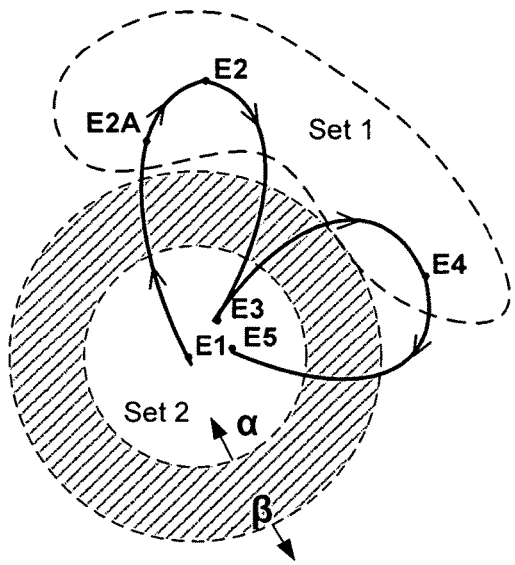
FIG. 7F is a diagram illustrating grouping of data points based on a user's orientation during a jumping jack exercise.

When the user is engaging in unexpected behavior, there might be false positive extreme points in terms of reps. In some cases, if, by removing one or more extreme points, a rep can be identified or a rep count can be increased, then the one or more extreme points are pruned. In other words, pruning (removing) these points can improve the accuracy of counting reps. FIG. 7F shows a situation in which a false positive extreme point reduces the number of rep counts. In the example of FIG. 7F, E2A is identified as an extreme point. E2A prevents E1-E2A-E2-E3 from being counted as a repetition because E1 to E2A is not a switch (no change in direction) and E2A to E2 is not a switch (no change in direction). Therefore, the progression of E1-E2A-E2 does not constitute two phases and E2-E3-E4 would be counted as one rep. Consider the case in which E2A is pruned. This would result in the situation illustrated in FIG. 7E, e.g., two reps as follows: the switch from E1 to E2 is a phase; the switch from E2 to E3 is another phase, and these two phases (from E1 to E2 then to E3) form a rep. The switch can be detected by the sensors. Similarly, the sequence E3 to E4 to E5 is another rep. In summary, the five points, E1-E5 form two reps. Thus, pruning E2A would increase the rep count.

Figure 8:
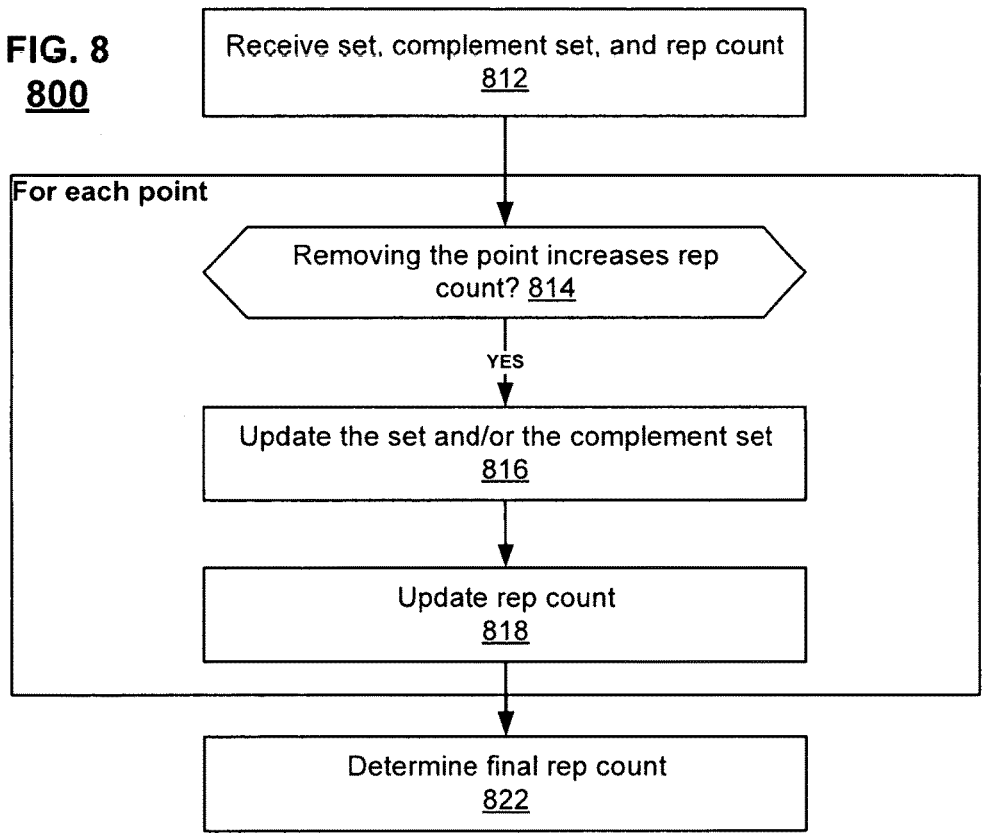
FIG. 8 is a flowchart illustrating an embodiment of a process for determining a number of repetitions of an exercise motion.

FIG. 8 is a flowchart illustrating an embodiment of a process 800 for removing or pruning extreme points, identifying sets, and counting reps based on the updated sets of extreme points. The method 800 can be performed as part of another process, for example, as part of or after 624 of FIG. 6. In 812, the method 800 receives (e.g., from 624 of process 600) a set, a complement set, and a rep count for these two sets. For each point, the method 800 determines whether removing the point from the set increases the rep count for the received sets of data (814). If so, the method 800 removes the point from the set (or the complement set) to which the point belonged (816). Otherwise, the method terminates for the current point and proceeds to evaluate the next point, if appropriate (not shown for simplicity). In 818, the rep count is updated. After performing 814-818 for each of the points in the set and the complement set, the method 800 determines a final rep count (822). In some embodiments, the final rep count is the highest rep count from among several options. In other embodiments, the final rep count can be an average rep count between the lowest rep count and the highest rep count. Other ways of optimizing the rep count are also possible. In the case of the tradeoff between computational complexity and accuracy, the desired level of accuracy is tunable according to conventional techniques.

In some embodiments, the method 800 is a dynamic programming process that groups detected extreme points and prunes the extreme point(s) while the points are being collected. The method 800 need not wait for all points to be collected, but instead can process the last N points and prune any points as needed.

In some embodiments, a user or a trainer can input an alpha value and a beta value to the management device (e.g., via a user interface provided by a training application running on the management device), and then perform a series of motions while wearing the sensor device. The sensor device will detect the trainer's motions, and determine the repetitions based on the techniques described herein and give real time counting feedback. If the sensor device is counting the repetitions as expected, then the input alpha and beta values are saved. Otherwise, the trainer may adjust the alpha and beta values.

If the number of counts appear to be fewer than what the trainer actually performed, the trainer can make the alpha bigger and/or the beta smaller. In one aspect, this would make the training more "lenient" or allow a wider range of motion to count as a repetition. This is because increasing alpha would increase the range of motion sufficient to count as being close to a particular position. Decreasing beta would decrease the range of motion sufficient to count as departing from the particular position.

If the number of counts appears to be higher than what the trainer actually performed, the trainer can make the alpha smaller and/or the beta bigger. In one aspect, this would make the training "stricter" or narrow a range of motion to count as a repetition. This is because decreasing alpha would decrease the range of motion sufficient to count as being close to a particular position. Increasing beta would increase the range of motion sufficient to count as departing from the particular position.

The trainer then repeats the motions to be detected by the sensor device and receives real time counting feedback again. The trainer will repeat the adjustment process until he is satisfied that the sensor device is correctly counting. This way, the trainer can specify any type of motion he is interested in coaching a user to perform, rather than relying only on system presets.

The trainer can upload the workout to a server (such as the server 120 shown in FIG. 1). The workout can comprise a set of coached motions (e.g., pull-ups, push-ups, crunches, bicep curls, etc.), where each coached motion includes at least one of: video, an alpha value, and/or a beta value. In some embodiments, the trainer species only the alpha value or only the beta value. Additional information such as voice coaching, subtitles, explanation, etc. can be added. Other users can download the workout and follow the workout. During the workout, for each coached motion, the user can perform the motion as instructed by the trainer on the video/audio/subtitle, his repetition of performing the motion is counted by the sensor device, and feedback is given.

Figure 9:
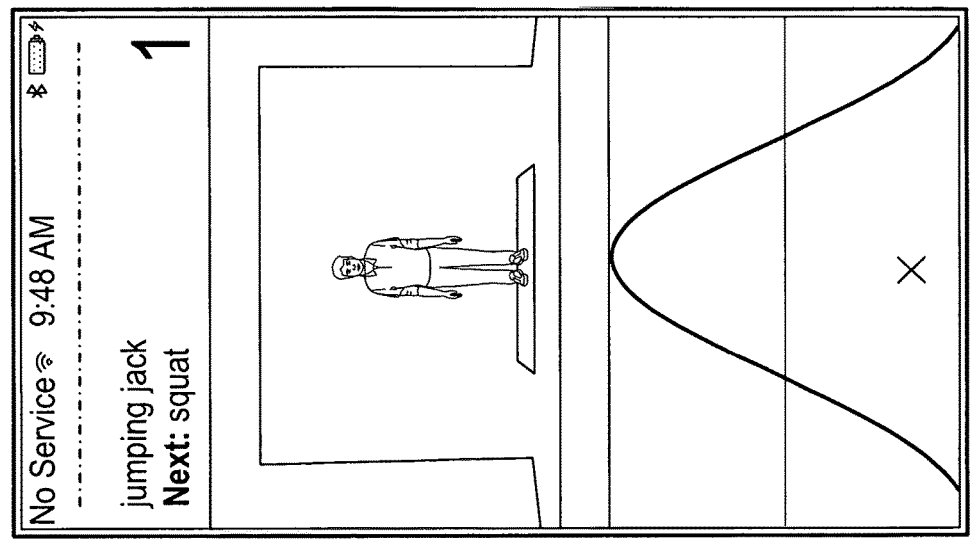
FIG. 9 is an example user interface displaying feedback.

FIG. 9 illustrates an embodiment of a user interface for providing coaching during an exercise. For example, the user interface of FIG. 9 can be displayed as part of 302 of FIG. 3B. In the example of FIG. 9, a preparation stage is displayed on the user interface. With audio and visual hints, the user is supposed to stay static with the preparation posture. The sensor sends the data to the management device, which compares the motion data (e.g., speed, orientation) over time to detect if the user is ready for such a preparation phase. For example, the sensed linear and rotational speed should be lower than a threshold, the user's arm should be perpendicular or parallel to the ground, etc.

Figure 10A:
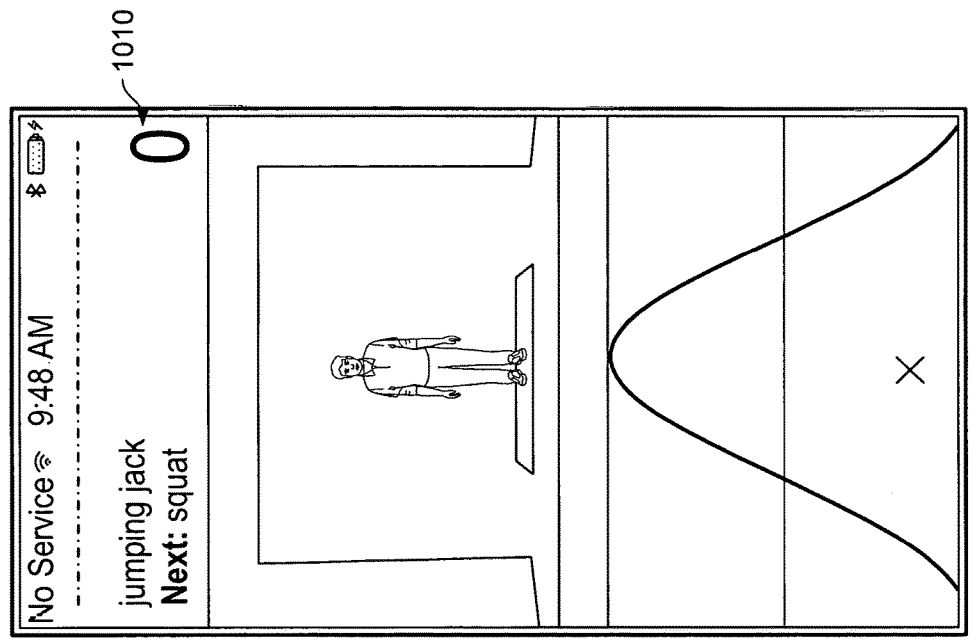
FIG. 10A is an example user interface displaying feedback.
Figure 10B:
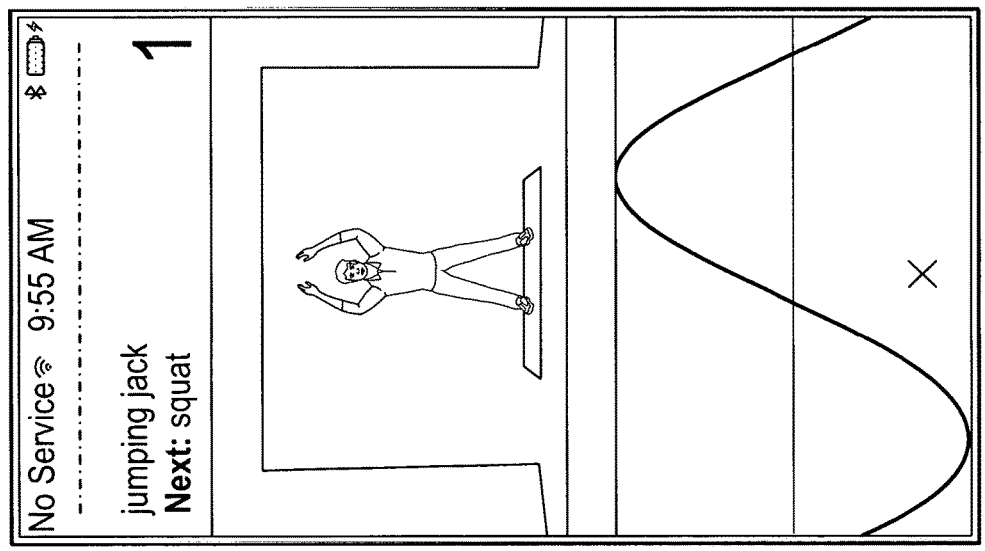
FIG. 10B is an example user interface displaying feedback.

With audio and visual hint, the user is instructed to start the workout. FIGS. 10A and 18B illustrate embodiments of a user interface for providing coaching during an exercise. In an embodiment, the workout is a dynamic motion such as a jumping jack, where the user moves back and forth between two states (FIG. 10A and FIG. 10B). In this example, one cycle of back and forth constitutes one rep. A display for the repetition count is shown in region 1010. The repetition count is incremented as the number of determined repetitions increases. In another embodiment, the workout is a static motion such as a plank (FIG. 11). In yet another embodiment, the workout includes a sequence of exercises, which may include a combination of dynamic and static motions.

Configuration of an automated personal fitness coaching device to accurately identify and track repetitive motions has been described. The identification and tracking process is tunable to count repetitions based on the quality (e.g., range) of a user's motions and allows the user to receive feedback regarding the exercise including a number of repetitive motions performed.

The modules described above can be implemented as software components executing on one or more processors, as hardware components such as programmable logic devices (e.g., microprocessors, field-programmable gate arrays (FPGAs), digital signal processors (DSPs), etc.), Application Specific Integrated Circuits (ASICs) designed to perform certain functions, or a combination thereof. In some embodiments, the modules can be embodied by a form of software products which can be stored in a nonvolatile storage medium (such as optical disk, flash storage device, mobile hard disk, etc.), including a number of instructions for making a computer device (such as personal computers, servers, network equipment, etc.) implement the methods described in the embodiments of the present application. The modules may be implemented on a single device or distributed across multiple devices. The functions of the modules may be merged into one another or further split into multiple sub-modules.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method, comprising:
   obtaining a plurality of motion data samples collected during a repetitive fitness exercise, wherein the plurality of motion data samples is collected from at least one sensor attached to a body of a user and communicatively coupled to a management device, the management device configured to evaluate the user's performance of the fitness exercise;
   identifying among the plurality of motion data samples a set of extreme points;
   determining a number of repetitions performed during the fitness exercise based on the set of extreme points;
   updating the number of repetitions, including by:
      forming a first set of extreme points and a second set of extreme points based on the set of extreme points;

determining whether removing an extreme point from at least one of the first set and the second set changes the determined number of repetitions; and responsive to the determination that removing the extreme point changes the determined number of repetitions, removing the extreme point from at least one of the first set and the second set;

evaluating the user's performance of the fitness exercise based on the updated number of repetitions; and outputting the evaluation of the user's performance of the fitness exercise via at least one of: the management device and an output device.

2. The method of claim 1, wherein the identification of the set of extreme points includes:

selecting a candidate sample from the plurality of motion data samples;

identifying a sequence of samples including the candidate sample;

determining a sample distance based on the identified sequence of samples;

determining whether the sample distance is a local minimum; and responsive to the determination that the sample distance is the local minimum, identifying the candidate sample as an extreme point and adding the candidate sample to the set of extreme points.

3. The method of claim 2, wherein the sequence of samples has an equal number of samples preceding the candidate sample and succeeding the candidate sample.

4. The method of claim 2, wherein the determining the sample distance includes summing respective distances between an orientation (Q) of a sample preceding the candidate sample and an orientation of a sample succeeding the candidate sample.

5. The method of claim 1, wherein the set of extreme points includes a predefined number of extreme points.

6. The method of claim 1, wherein the first set is formed by extreme points having an orientation distance within a first threshold of each other.

7. The method of claim 1, wherein the second set is formed by extreme points having an orientation distance with respect to one sample of the first set above a second threshold.

8. The method of claim 1, wherein the determination of the number of repetitions includes counting a quantity of phases based on the first set and the second set.

9. The method of claim 8, wherein a repetition includes two phases.

10. The method of claim 1, wherein the change to the determined number of repetitions includes: (i) increasing the number of repetitions, or (ii) making a repetition to be identifiable, or (iii) both (i) and (ii).

11. The method of claim 1, further comprising:

determining a baseline pose of a user, wherein the plurality of motion data samples is corrected based on the baseline pose; and instructing the user to begin the exercise responsive to a determination that the user is prepared for the exercise.

12. The method of claim 1, further comprising providing real-time output regarding the updated number of repetitions.

13. The method of claim 1, further comprising:

determining a set of one or more measurements of a user's body positions based on the plurality of motion data samples;

comparing the user's body positions to a target to evaluate the user's performance; and outputting feedback regarding the user's body positions based on the comparison to decrease a difference between the user's body positions and the target.

14. The method of claim 1, wherein the plurality of motion data samples includes orientation information about a user's body position.

15. The method of claim 1, wherein the plurality of motion data samples includes angular velocity and acceleration.

16. The method of claim 1, wherein the outputting includes sending the number of repetitions to be displayed on a device.

17. The method of claim 1, further comprising:

obtaining a plurality of motion data samples collected during a static fitness exercise;

determining a length of time that a user remains static during the static fitness exercise; and outputting information based on the determined length of time.

18. A system, comprising:

a processor configured to:

obtain a plurality of motion data samples collected during a repetitive fitness exercise, wherein the plurality of motion data samples is collected from at least one sensor attached to a body of a user and communicatively coupled to a management device the management device configured to evaluate the user's performance of the fitness exercise;

identify among the plurality of motion data samples a set of extreme points; and determine a number of repetitions performed during the fitness exercise based on the set of extreme points;

update the number of repetitions, including by:

forming a first set of extreme points and a second set of extreme points based on the set of extreme points;

determining whether removing an extreme point from at least one of the first set and the second set changes the determined number of repetitions; and responsive to the determination that removing the extreme point changes the determined number of repetitions, removing the extreme point from at least one of the first set and the second set; and evaluating the user's performance of the fitness exercise based on the updated number of repetitions; and output the evaluation of the user's performance of the fitness exercise via at least one of: the management device and an output device; and a memory coupled to the processor and configured to provide the processor with instructions.

19. A computer program product, the computer program product being embodied in a non-transitory computer readable storage medium and comprising computer instructions for:

obtaining a plurality of motion data samples collected during a repetitive fitness exercise, wherein the plurality of motion data samples is collected from at least one sensor attached to a body of a user and communicatively coupled to a management device, the management device configured to evaluate the user's performance of the fitness exercise;

identifying among the plurality of motion data samples a set of extreme points;

determining a number of repetitions performed during the fitness exercise based on the set of extreme points;

updating the number of repetitions, including by:
  forming a first set of extreme points and a second set of extreme points based on the set of extreme points;
  determining whether removing an extreme point from at least one of the first set and the second set changes the determined number of repetitions;
  responsive to the determination that removing the extreme point changes the determined number of repetitions, removing the extreme point from at least one of the first set and the second set; and
  evaluating the user's performance of the fitness exercise based on the updated number of repetitions; and
outputting the evaluation of the user's performance of the fitness exercise via at least one of: the management device and an output device.

20. The method of claim 1, wherein the at least one sensor is configured to collect acceleration samples, angular velocity samples, and magnetic field samples.

21. The method of claim 1, wherein the at least one sensor includes at least one of: an accelerometer, gyroscope, and magnetometer.

\* \* \* \* \*